US011055668B2

(12) United States Patent
Liu et al.

(10) Patent No.: US 11,055,668 B2
(45) Date of Patent: Jul. 6, 2021

(54) MACHINE-LEARNING-BASED APPLICATION FOR IMPROVING DIGITAL CONTENT DELIVERY

(71) Applicant: Microsoft Technology Licensing, LLC, Redmond, WA (US)

(72) Inventors: Hongche Liu, Fremont, CA (US); Divya Venugopalan, Redwood City, CA (US); Shaunak Chatterjee, Sunnyvale, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 368 days.

(21) Appl. No.: 16/019,359

(22) Filed: Jun. 26, 2018

(65) Prior Publication Data

US 2019/0392396 A1 Dec. 26, 2019

(51) Int. Cl.
*G06Q 10/10* (2012.01)
*G06N 20/00* (2019.01)
*G06F 16/901* (2019.01)

(52) U.S. Cl.
CPC ..... *G06Q 10/1053* (2013.01); *G06F 16/9024* (2019.01); *G06N 20/00* (2019.01)

(58) Field of Classification Search
CPC . G06Q 10/1053; G06N 20/00; G06F 16/9024
See application file for complete search history.

(56) References Cited

U.S. PATENT DOCUMENTS

| 9,196,245 | B2* | 11/2015 | Larcheveque | ...... G10L 15/1815 |
| 9,418,117 | B1* | 8/2016 | Molina | ............ G06F 16/24578 |
| 10,025,775 | B2* | 7/2018 | Nowson | .................. G06F 40/30 |
| 2012/0173243 | A1* | 7/2012 | Anand | ..................... G06F 40/40 |
| | | | | 704/270.1 |
| 2014/0170610 | A1* | 6/2014 | Ridgeway | .............. G09B 19/06 |
| | | | | 434/156 |
| 2018/0130024 | A1* | 5/2018 | Fang | ...................... G06N 20/00 |
| 2019/0095869 | A1* | 3/2019 | Zhang | ..................... G06F 16/00 |

* cited by examiner

*Primary Examiner* — Huawen A Peng
(74) *Attorney, Agent, or Firm* — Schwegman Lundberg & Woessner, P.A.

(57) ABSTRACT

A machine for improving content delivery generates a graph representing a personalized conversational flow for sequenced delivery of digital content. The graph includes nodes representing interactive dialogues between a machine and a user, and edges that connect the nodes. The machine causes display of a user interface including a prompt related to job-seeking guidance. The machine, based on a first action in response to the prompt, dynamically adjusts the graph, the dynamic adjusting including selecting a first node. The machine generates and causes display of a first incentive content item, and a first call-to-action content item. The machine, in response to a second action received in response to the first call-to action content item, dynamically selects an edge connecting the first node and a further node. The dynamic selecting of the edge results in display of a further incentive content item, and a further call-to-action content item.

20 Claims, 10 Drawing Sheets

MACHINE-LEARNING-BASED APPLICATION FOR IMPROVING DIGITAL CONTENT DELIVERY

TECHNICAL FIELD

The present application relates generally to systems, methods, and computer program products that utilize machine learning to improve digital content delivery.

BACKGROUND

Some personalized searches involve analyzing the user characteristics against a corpus of possible results to find the best options for a user. For example, a job search may generate different results for different users depending on their background, education, experience, etc. Sometimes, finding similarities between users is helpful because if a user has shown interest in a job, a user with similar characteristics may also be interested in that job too.

However, the number of users of an online system may be in the millions, and the categories of data associated with the users (e.g., educational institutions, current jobs, etc.) may also be into the thousands or millions. Finding similarities among all these users may be a computationally expensive proposition given the large amount of data and possible categories, thereby resulting in a technical problem of excessive consumption of the electronic resources of a computer system performing the search.

BRIEF DESCRIPTION OF THE DRAWINGS

Some embodiments are illustrated by way of example and not limitation in the figures of the accompanying drawings, in which.

DETAILED DESCRIPTION

Figure 1:
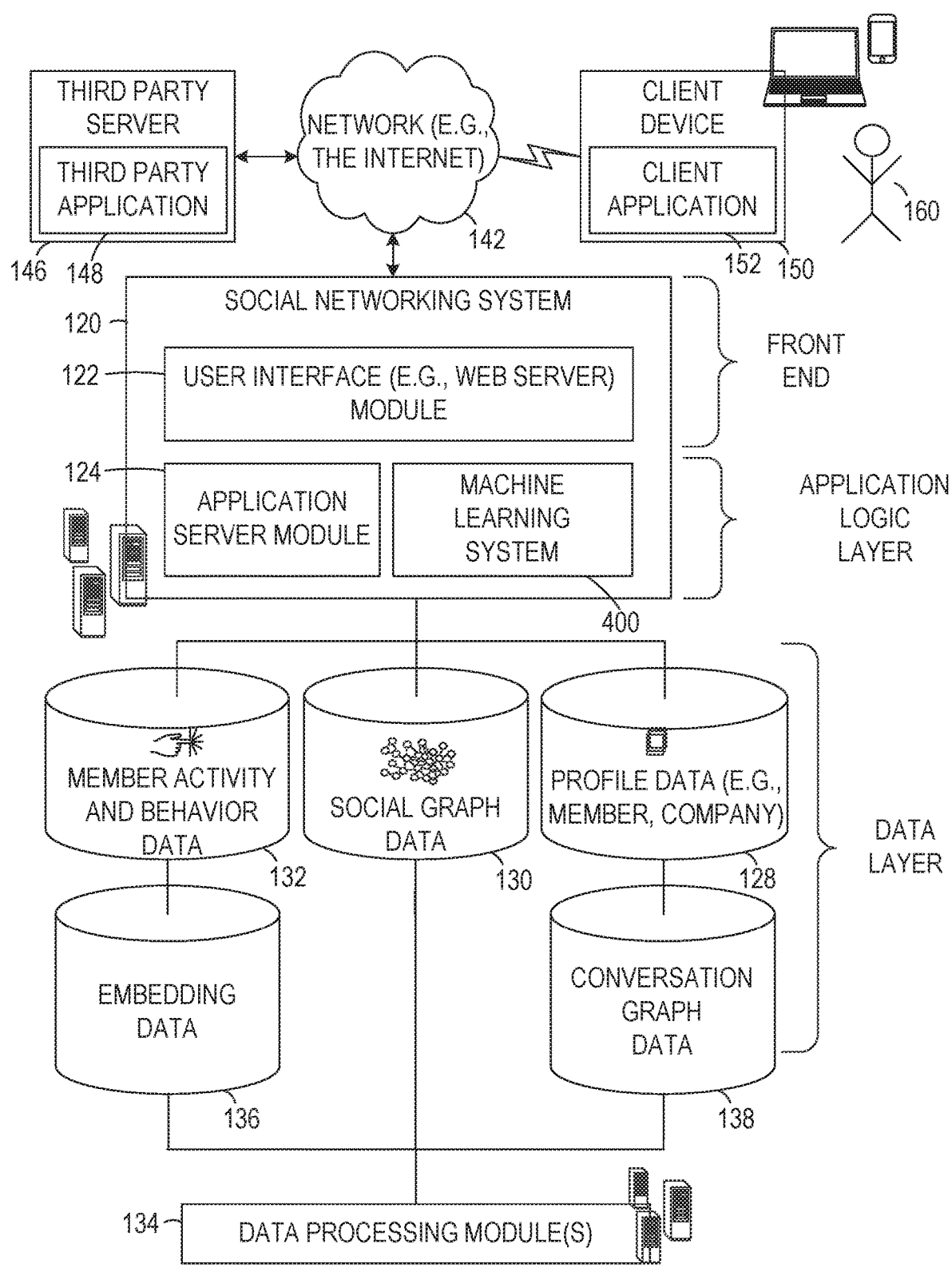
FIG. 1 is a network diagram illustrating a client-server system, according to some example embodiments.

Example methods and systems for conversation graph learning to improve digital content delivery are described. In the following description, for purposes of explanation, numerous specific details are set forth to provide a thorough understanding of example embodiments. It will be evident to one skilled in the art, however, that the present subject matter may be practiced without these specific details. Furthermore, unless explicitly stated otherwise, components and functions are optional and may be combined or subdivided, and operations may vary in sequence or be combined or subdivided.

Digital content is ubiquitous in multiple avenues of an online service—as a part of a flagship feed, interest feed, emails, notifications, and other products. An example of an online service is a social network service (e.g., LinkedIn® professional networking services). Despite the omnipresence of digital content items on an online service, a technical problem associated with providing relevant digital content to users of the online service is the automatic generation of a personalized conversation flow associated with a user and automatic selecting and presenting of digital content items based on particular online contexts associated with the user and the personalized conversation flow. For example, in the context of a social networking service (hereinafter also "SNS") that provides professional networking services (e.g., job-finding or recruiter services), many users could benefit from guidance with respect to various aspects of the process of looking for a new job. User-requested searches often utilize user-related data from a user's profile. A user profile that is lacking information, missing connections to other users, or job applications that that are not drafted to target jobs that match the user's skills and experience well may lead to inefficient use of the electronic resources of a computer system performing searches requested by the users.

A machine learning system may provide a technical solution to the technical problem of automatic generating a personalized conversation flow associated with a user and automatic selecting and presenting of digital content items based on particular online contexts associated with the user and the personalized conversation flow. For instance, the machine learning system generates a conversation graph associated with a user identifier of the user. The conversation graph represents a personalized conversational flow for sequenced delivery of digital content to a client device associated with the user identifier. The conversation graph includes a plurality of nodes that represent a plurality of interactive dialogues between a machine and the user associated with the user identifier. The conversation graph also includes one or more edges that connect the plurality of nodes. The one or more edges represent one or more transitions between the plurality of interactive dialogues. The generating of the conversation graph is performed using one or more machine learning algorithms.

The machine learning system executes a software application (e.g., a job-seeker coach bot) that results in generating and causing display of a user interface on the client device. The executing of the software application is based on a signal that indicates an online job-seeking activity by the user. The signal is received from the client device. Examples of such a signal is an indication of a particular web page (e.g., a careers page of a company, "how to improve your resume" web page, etc.) that is displayed on the client device, or a particular action by the user (e.g., a request to be contacted by a recruiter, an application for a job, etc.). The user interface caused to display on the client device includes a prompt related to job-seeking guidance for the user. For example, the prompt states "Help me land my dream job," and includes a mechanism (e.g., a button) that can be activated by the user to indicate that the user is interested in engaging with the software application to receive job-seeking guidance. In some instances, the prompt provides the user with a number of options of contexts associated with various aspects of job-searching (e.g., improving a user profile, finding additional social network connections who may refer the user for jobs, improving a job application to make it more compelling, or preparing for an interview). A selection of a particular option may be associated with a particular action by the user which, in turn, may indicate a particular conversation flow context that the user would be more interested in.

The machine learning system dynamically adjusts the conversation graph associated with the user identifier. The dynamic adjusting of the conversation graph is based on an indication of a first action, by the user, received from the client device in response to the prompt. For example, based on the prompt that displays a plurality of options pertaining to various conversation flow contexts, the user selects a particular option. The particular option indicates that the user has selected, for example, to update his user profile. The selection of other options may indicate other conversation flow contexts that the user is interested in. The dynamic adjusting of the conversation graph includes selecting a first node of the conversation graph based on the first action. The first node is the node from which the conversation flow will start.

Based on the dynamic adjusting of the conversation graph, the machine learning system generates and causes display, in the user interface, of a first incentive content item associated with a first interactive dialogue represented by the first node of the conversation graph, and a first call-to-action content item associated with the first incentive content item. In some instances, an interactive dialogue includes three components: an incentive content item, a call-to-action content item, and a reward. The reward may be a digital content item (e.g., certain information), or a benefit that may be derived by the user if the user executes the call-to-action request. For example, an incentive content item is telling the user that users who post a photograph of themselves on the online system are four times more likely to be contacted regarding jobs suitable to them, or providing statistics that show that users with photos tend to have higher salaries. The call-to-action content item may guide the user through the process of posting a photograph on the online system. The reward content item may be an immediate benefit that is provided to the user, or a long-term benefit associated with performing the call-to-action request.

After navigating the first interactive dialogue, the machine learning system may transition to other interactive dialogues in order to assist the user in updating other aspects of the user profile, such as adding one or more skills, or one or more identifiers of organizations with which the user is associated, or provide other functionalities that may help the user find their next job. Accordingly, in response to a further (e.g., a second, an additional, etc.) indication of a second action received from the client device in response to the first call-to action content item, the machine learning system dynamically selects a particular edge connecting the first node and a further (e.g., a second, an additional, etc.) node in the conversation graph. The dynamic selecting of the particular edge results in generating and causing display, in the user interface, of a further incentive content item associated with a further interactive dialogue represented by the further node of the conversation graph, and a further call-to-action content item associated with the further incentive content item.

In some example embodiments, the machine learning system identifies the users who are associated with job seeker scores that exceed a job seeker score threshold value. In order to improve its efficiency, the machine learning system may, in some instances, generate conversation graphs only for the users identified to be associated with job seeker scores that exceed the job seeker score threshold value.

In certain example embodiments, each of the nodes included in the conversation graph are associated with a score value that indicates the likelihood (e.g., probability) that the user associated with the conversation graph would choose to engage with the content included in the interactive dialogue represented by the node. The score value is determined based on various user-related data, such as user profile data, user activity and behavior data, and social graph data associated with the user. In some instances, the score value is determined by the machine learning system using the one or more machine learning algorithms.

In various example embodiments, the conversation graph associated with a user is pre-built (e.g., pre-computed) but the navigation of the conversation graph depends on the actions of the user along the conversation graph. The machine learning system may identify the actions of the user with respect to previously presented digital content items, and may utilize this user activity and behavior data to modify the score values that are associated with the other nodes and that indicate the likelihood that the user would engage with the interactive dialogues represented by the other nodes. The machine learning system may rank the nodes in the conversation graph based on the modified score values, and may select and present to the client device one or more interactive dialogues that are associated with top-ranking nodes (e.g., nodes associated with modified score values that exceed a certain score threshold value).

For example, an interactive dialogue pertaining to helping identify new social network connections for a user and establishing those connections may include a plurality of digital content items designed to facilitate the navigation through the interactive dialogue. The user, through the user's performing or not performing one or more calls-to-actions associated with the interactive dialogue, communicates to the machine learning system via the user interface of the client device that the user is interested or not interested in establishing the new social network connections. If the user is interested in establishing the new social network connections, the machine learning system continues to provide digital content that facilitates the establishing the new social network connections. If the user is not interested in establishing the new social network connections, the machine learning system may transition the conversation flow to a different interactive dialogue. The transitioning to a different conversation flow may include identifying another node in the conversation graph associated with the user, wherein the other node represents another interactive dialogue. The other node may be identified to have the highest ranked modified score value. The modified score value is generated based on the previous user actions with respect to previously presented items of digital content, using the one or more machine learning algorithms. The other interactive dialogue may be associated with another topic, such as improving the user profile of the user, generating a job application, selecting and registering for a class directed to improving a certain skill, etc.

In certain example embodiments, the user's actions (e.g., selections of options, clicking on links, reading content, performing calls-to-actions, etc.) are used as input into the machine learning algorithms used to generate, modify, or adjust the conversation graph associated with a user identifier of the user. The modifying the conversation graph may include adding new nodes and edges to correspond to new interests identified for the user, or removing nodes and edges associated with content that is not relevant to the user. This input improves the machine learning algorithms and the machine learning system by enhancing the space efficiency of the graph data structures, and searches based on the graph data structures.

In some example embodiments, the features (hereinafter also "attributes") included in user profiles are used for training machine learning models (e.g., deep learning machine training models) for generating search facets for performing personalized searched that identify relevant jobs for users of the online service. In machine learning, a feature is an individual measurable property or characteristic of a phenomenon being observed. For example, in the context of the online system, features of similar user profiles are inputs to machine learning models that generate search facets relevant to a particular user, and identify jobs that the particular user may be interested in.

In various example embodiments, using expressive features in deep learning models to understand content, as well as users' preferences for content not only provide a richer experience to the user, but also enhances machine learning tools for digital content processing and understanding. Further, content representation learning improves data processing efficiency and data storage.

Deep learning refers to a class of techniques used to model a response by generating complex data transformations and abstractions using multi-layer neural networks. Deep learning can support a vast array of applications, ranging from response prediction, feature generation, natural language understanding, speech or image recognition, and understanding.

Deep learning techniques may be used in modeling a user's response when a machine learning system recommends one or more search facets to a user to assist a user with a job search. Often a user's response to a search facet recommendation is a function of a relevance of the search facet to the user's interests, context, or timing of the presentation of the digital content.

Many relevance problems aim at identifying, predicting, or searching something for the user, such as finding a job that would interest the user. In some example embodiments, relevance helps identify the things that are appropriate for the user based on the user features and one or more types of similarities. For example, a job search engine may find jobs that would be interesting for the user because "similar" users have explored those jobs. However, finding similarities among users, among users and jobs, users and articles, users and advertisements, etc., are complex problems, especially in a system where there could be millions of users, jobs, articles, and advertisements.

In machine learning, categorical features are those features that may have a value from a finite set of possible values. In some example embodiments, categorical features include skills of the user, title of the user, industry of the user, company of the user, and educational institutions attended by the user.

In some example embodiments, similarities may be identified by converting categorical values to vectors (a process referred to herein as "embedding") and then utilizing tools well-suited for operating on vectors. However, a simple vector definition where each value of the category is assigned a position within the vector (a representation sometimes called "bag of words") results in very large vectors with very sparse values (e.g., a single 1 among 35,000 values). Because such vectors are difficult to work with, reducing the size of the vectors, in some instances, is important.

In some example embodiments, obtaining vectors with an embedded semantic meaning is important because similarity analysis is simplified using the embedded semantic meaning. For example, two vectors being close to each other indicates that the two vectors represent two categorical values that are similar.

A machine learning system may utilize embeddings to provide a lower dimensional representation of different features, and can learn the embeddings along with the model parameters. In certain example embodiments, a deep learning model for response prediction is characterized using three "macro" layers: (1) an input layer which takes in the input features, and fetches embeddings for the input, (2) one or more intermediate (or hidden) layers which introduces nonlinear neural net transformations to the inputs, and (3) a response layer which transforms the final results of the intermediate layers to the prediction. The response layer may be a Sigmoid function.

An example method and system for improving digital content delivery based on a conversation graph dynamically generated using machine learning algorithms may be implemented in the context of the client-server system illustrated in FIG. 1. As illustrated in FIG. 1, the machine learning system 400 is part of the social networking system 120. As shown in FIG. 1, the social networking system 120 is generally based on a three-tiered architecture, consisting of a front-end layer, application logic layer, and data layer. As is understood by skilled artisans in the relevant computer and Internet-related arts, each module or engine shown in FIG. 1 represents a set of executable software instructions and the corresponding hardware (e.g., memory and processor) for executing the instructions. To avoid obscuring the inventive subject matter with unnecessary detail, various functional modules and engines that are not germane to conveying an understanding of the inventive subject matter have been omitted from FIG. 1. However, a skilled artisan will readily recognize that various additional functional modules and engines may be used with a social networking system, such as that illustrated in FIG. 1, to facilitate additional functionality that is not specifically described herein. Furthermore, the various functional modules and engines depicted in FIG. 1 may reside on a single server computer, or may be distributed across several server computers in various arrangements. Moreover, although depicted in FIG. 1 as a three-tiered architecture, the inventive subject matter is by no means limited to such architecture.

As shown in FIG. 1, the front end layer consists of a user interface module(s) (e.g., a web server) 122, which receives requests from various client-computing devices including one or more client device(s) 150, and communicates appropriate responses to the requesting device. For example, the user interface module(s) 122 may receive requests in the form of Hypertext Transport Protocol (HTTP) requests, or other web-based, application programming interface (API) requests. The client device(s) 150 may be executing conventional web browser applications and/or applications (also referred to as "apps") that have been developed for a specific platform to include any of a wide variety of mobile computing devices and mobile-specific operating systems (e.g., iOS™, Android™, Windows® Phone).

For example, client device(s) 150 may be executing client application(s) 152. The client application(s) 152 may provide functionality to present information to the user and communicate via the network 142 to exchange information with the social networking system 120. Each of the client devices 150 may comprise a computing device that includes at least a display and communication capabilities with the network 142 to access the social networking system 120. The client devices 150 may comprise, but are not limited to, remote devices, work stations, computers, general purpose computers, Internet appliances, hand-held devices, wireless devices, portable devices, wearable computers, cellular or mobile phones, personal digital assistants (PDAs), smart phones, smart watches, tablets, ultrabooks, netbooks, laptops, desktops, multi-processor systems, microprocessor-based or programmable consumer electronics, game consoles, set-top boxes, network PCs, mini-computers, and the like. One or more users 160 may be a person, a machine, or other means of interacting with the client device(s) 150. The user(s) 160 may interact with the social networking system 120 via the client device(s) 150. The user(s) 160 may not be part of the networked environment, but may be associated with client device(s) 150.

As shown in FIG. 1, the data layer includes several databases, including a database 128 for storing data for various entities of a social graph. In some example embodiments, a "social graph" is a mechanism used by an online social networking service (e.g., provided by the social networking system 120) for defining and memorializing, in a digital format, relationships between different entities (e.g., people, employers, educational institutions, organizations, groups, etc.). Frequently, a social graph is a digital representation of real-world relationships. Social graphs may be digital representations of online communities to which a user belongs, often including the members of such communities (e.g., a family, a group of friends, alums of a university, employees of a company, members of a professional association, etc.). The data for various entities of the social graph may include member profiles, company profiles, educational institution profiles, as well as information concerning various online or offline groups. Of course, with various alternative embodiments, any number of other entities may be included in the social graph, and as such, various other databases may be used to store data corresponding to other entities.

Consistent with some embodiments, when a person initially registers to become a member of the social networking service, the person is prompted to provide some personal information, such as the person's name, age (e.g., birth date), gender, interests, contact information, home town, address, the names of the member's spouse and/or family members, educational background (e.g., schools, majors, etc.), current job title, job description, industry, employment history, skills, professional organizations, interests, and so on. This information is stored, for example, as profile data in the database 128.

Once registered, a member may invite other members, or be invited by other members, to connect via the social networking service. A "connection" may specify a bi-lateral agreement by the members, such that both members acknowledge the establishment of the connection. Similarly, with some embodiments, a member may elect to "follow" another member. In contrast to establishing a connection, the concept of "following" another member typically is a unilateral operation, and at least with some embodiments, does not require acknowledgement or approval by the member that is being followed. When one member connects with or follows another member, the member who is connected to or following the other member may receive messages or updates (e.g., content items) in his or her personalized content stream about various activities undertaken by the other member. More specifically, the messages or updates presented in the content stream may be authored and/or published or shared by the other member, or may be automatically generated based on some activity or event involving the other member. In addition to following another member, a member may elect to follow a company, a topic, a conversation, a web page, or some other entity or object, which may or may not be included in the social graph maintained by the social networking system. With some embodiments, because the content selection algorithm selects content relating to or associated with the particular entities that a member is connected with or is following, as a member connects with and/or follows other entities, the universe of available content items for presentation to the member in his or her content stream increases. As members interact with various applications, content, and user interfaces of the social networking system 120, information relating to the member's activity and behavior may be stored in a database, such as the database 132. An example of such activity and behavior data is the identifier of an online ad consumption event associated with the member (e.g., an online ad viewed by the member), the date and time when the online ad event took place, an identifier of the creative associated with the online ad consumption event, a campaign identifier of an ad campaign associated with the identifier of the creative, etc.

The social networking system 120 may provide a broad range of other applications and services that allow members the opportunity to share and receive information, often customized to the interests of the member. For example, with some embodiments, the social networking system 120 may include a photo sharing application that allows members to upload and share photos with other members. With some embodiments, members of the social networking system 120 may be able to self-organize into groups, or interest groups, organized around a subject matter or topic of interest. With some embodiments, members may subscribe to or join groups affiliated with one or more companies. For instance, with some embodiments, members of the SNS may indicate an affiliation with a company at which they are employed, such that news and events pertaining to the company are automatically communicated to the members in their personalized activity or content streams. With some embodiments, members may be allowed to subscribe to receive information concerning companies other than the company with which they are employed. Membership in a group, a subscription or following relationship with a company or group, as well as an employment relationship with a company, are all examples of different types of relationships that may exist between different entities, as defined by the social graph and modeled with social graph data of the database 130. In some example embodiments, members may receive digital communications (e.g., advertising, news, status updates, etc.) targeted to them based on various factors (e.g., member profile data, social graph data, member activity or behavior data, etc.)

The application logic layer includes various application server module(s) 124, which, in conjunction with the user interface module(s) 122, generates various user interfaces with data retrieved from various data sources or data services in the data layer. With some embodiments, individual application server modules 124 are used to implement the functionality associated with various applications, services, and features of the social networking system 120. For example, an ad serving engine showing ads to users may be implemented with one or more application server modules 124. According to another example, a messaging application, such as an email application, an instant messaging application, or some hybrid or variation of the two, may be implemented with one or more application server modules 124. A photo sharing application may be implemented with one or more application server modules 124. Similarly, a search engine enabling users to search for and browse member profiles may be implemented with one or more application server modules 124. Of course, other applications and services may be separately embodied in their own application server modules 124. As illustrated in FIG. 1, social networking system 120 may include the machine learning system 600, which is described in more detail below.

Further, as shown in FIG. 1, a data processing module 134 may be used with a variety of applications, services, and features of the social networking system 120. The data processing module 134 may periodically access one or more of the databases 128, 130, 132, 136, or 138, process (e.g., execute batch process jobs to analyze or mine) profile data, social graph data, member activity and behavior data, embedding data, or conversation graph data, and generate analysis results based on the analysis of the respective data. The data processing module 134 may operate offline. According to some example embodiments, the data processing module 134 operates as part of the social networking system 120. Consistent with other example embodiments, the data processing module 134 operates in a separate system external to the social networking system 120. In some example embodiments, the data processing module 134 may include multiple servers, such as Hadoop servers for processing large data sets. The data processing module 134 may process data in real time, according to a schedule, automatically, or on demand.

Additionally, a third party application(s) 148, executing on a third party server(s) 146, is shown as being communicatively coupled to the social networking system 120 and the client device(s) 150. The third party server(s) 146 may support one or more features or functions on a website hosted by the third party.

Figure 2:
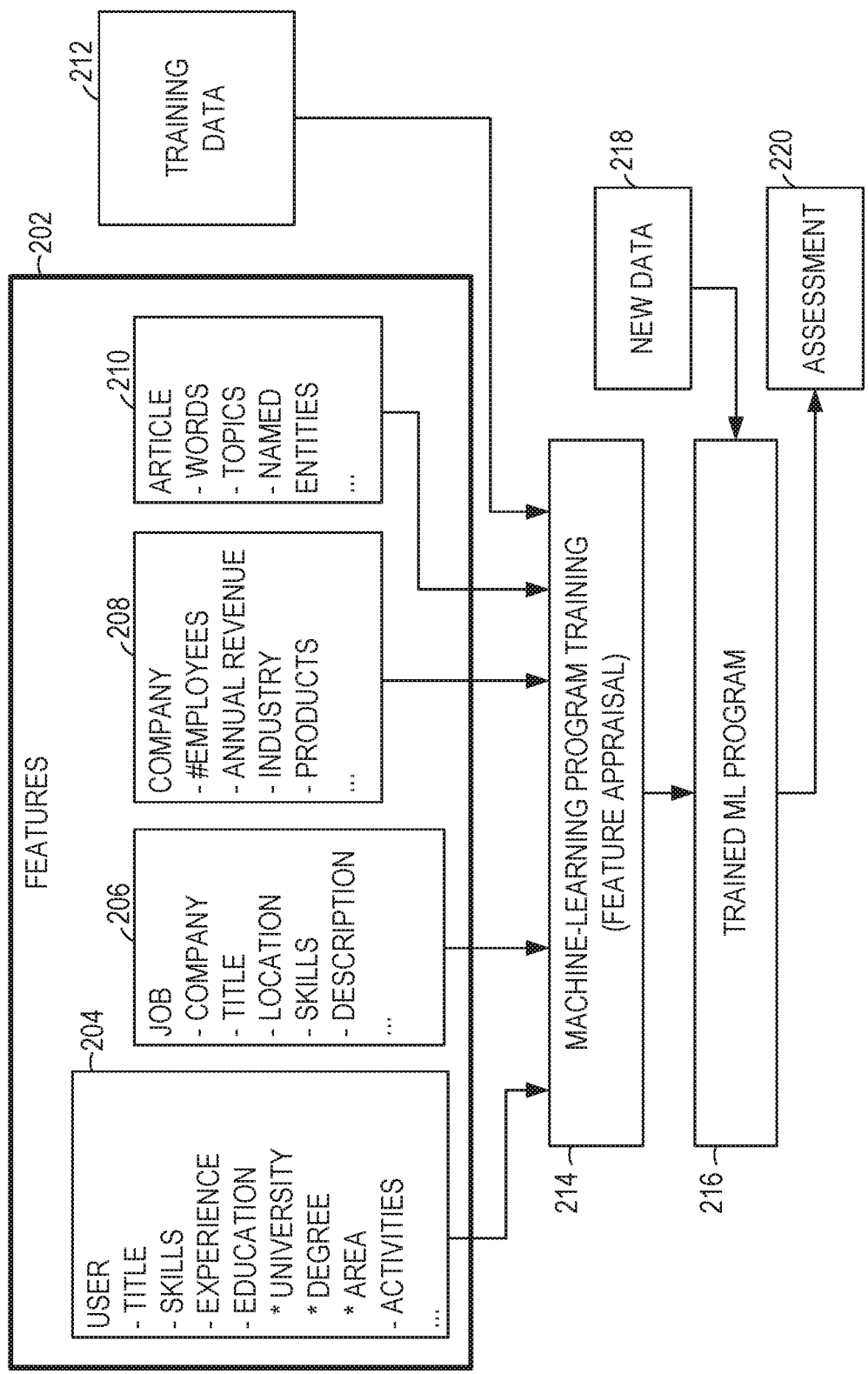
FIG. 2 illustrates the training and use of a machine-learning program, according to some example embodiments.

FIG. 2 illustrates the training and use of a machine-learning program, according to some example embodiments. In some example embodiments, machine-learning programs (MLP), also referred to as machine-learning algorithms or tools, are utilized to perform operations associated with building graphs, such as a conversation graph, or performing searches, such as digital content (e.g., articles, jobs, etc.) searches.

Machine learning is a field of study that gives computers the ability to learn without being explicitly programmed. Machine learning explores the study and construction of algorithms, also referred to herein as tools, that may learn from existing data and make predictions about new data. Such machine-learning tools operate by building a model from example training data 212 in order to make data-driven predictions or decisions expressed as outputs or assessments 220. Although example embodiments are presented with respect to a few machine-learning tools, the principles presented herein may be applied to other machine-learning tools.

In some example embodiments, different machine-learning tools may be used. For example, Logistic Regression (LR), Naive-Bayes, Random Forest (RF), neural networks (NN), matrix factorization, and Support Vector Machines (SVM) tools may be used for classifying or scoring job postings.

In general, there are two types of problems in machine learning: classification problems and regression problems. Classification problems, also referred to as categorization problems, aim at classifying items into one of several category values (for example, is this object an apple or an orange?). Regression algorithms aim at quantifying some items (for example, by providing a value that is a real number). In some embodiments, example machine-learning algorithms provide a job affinity score (e.g., a number from 1 to 100) to qualify each job as a match for a user of an online system, such as a member of the SNS (e.g., calculating the job affinity score). In certain embodiments, example machine-learning algorithms provide a member-article affinity score (e.g., a number from 1 to 100) to qualify each article as a match for the member (e.g., calculating the article affinity score). The machine-learning algorithms utilize the training data 212 to find correlations among identified features 202 that affect the outcome.

The machine-learning algorithms utilize features for analyzing the data to generate assessments 220. A feature 202 is an individual measurable property of a phenomenon being observed. The concept of feature is related to that of an explanatory variable used in statistical techniques such as linear regression. Choosing informative, discriminating, and independent features is important for effective operation of the MLP in pattern recognition, classification, and regression. Features may be of different types, such as numeric, strings, and graphs.

In one example embodiment, the features 202 may be of different types and may include one or more of user features 204, job features 206, company features 208, and article features 210. The user features 204 may include one or more of the data in the user profile 128, as described in FIG. 1, such as title, skills, endorsements, experience, education, and the like. The job features 206 may include any data related to the job, and the company features 208 may include any data related to the company. In some example embodiments, article features 210 include word data, topic data, named entity data, and the like.

The machine-learning algorithms utilize the training data 212 to find correlations among the identified features 202 that affect the outcome or assessment 220. In some example embodiments, the training data 212 includes known data for one or more identified features 202 and one or more outcomes, such as jobs searched by users, job suggestions selected for reviews, users changing companies, users adding social connections, users' activities online, etc.

With the training data 212 and the identified features 202, the machine-learning tool is trained at operation 214. The machine-learning tool appraises the value of the features 202 as they correlate to the training data 212. The result of the training is the trained machine-learning program 216.

When the machine-learning program 216 is used to perform an assessment, new data 218 is provided as an input to the trained machine-learning program 216, and the machine-learning program 216 generates the assessment 220 as output. For example, when a user performs a job search, a machine-learning program, trained with social network data, utilizes the user data and the job data, from the jobs in the database, to search for jobs that match the user's profile and activity.

Figure 3:
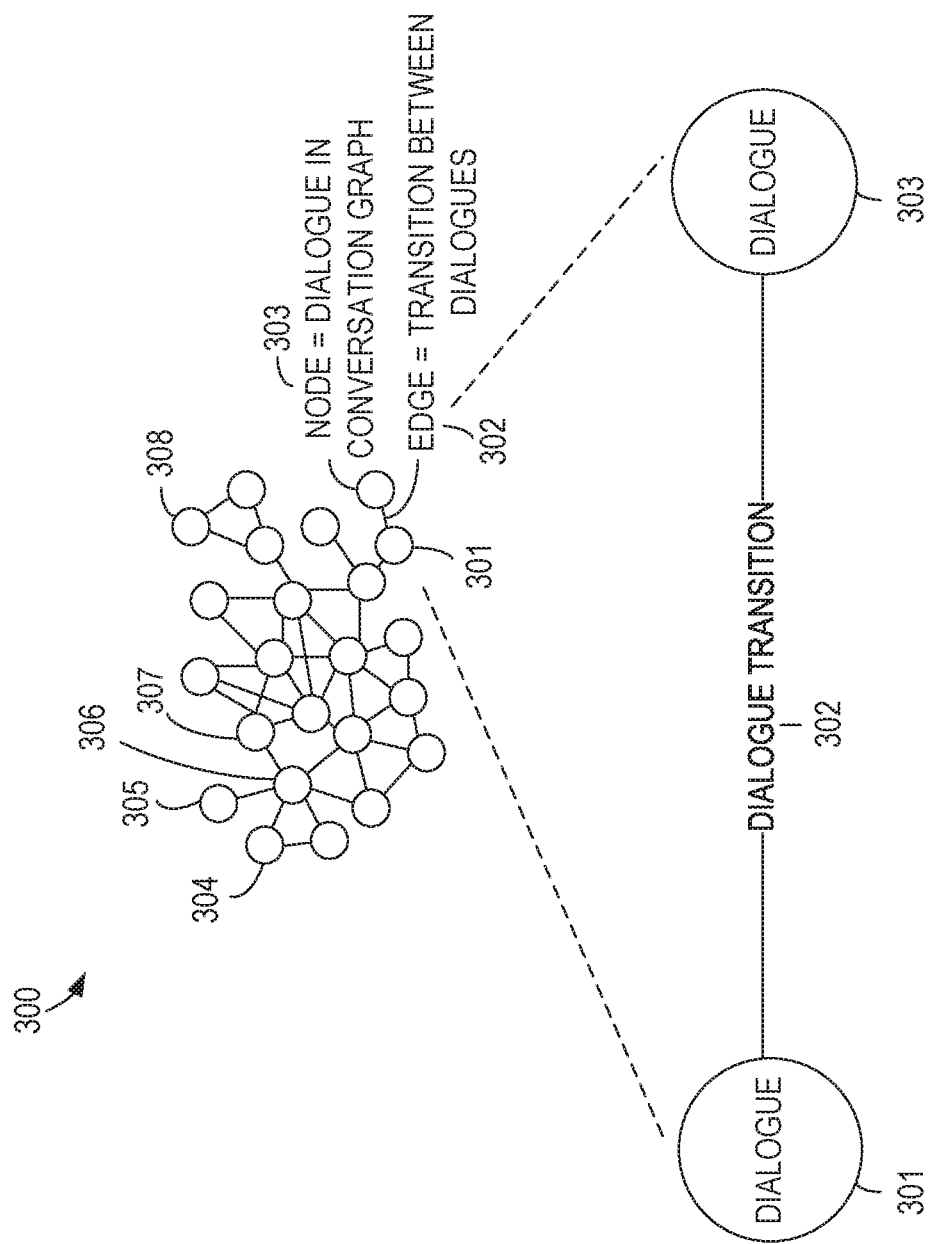
FIG. 3 is a diagram illustrating an example of a portion of a graph data structure for modelling a conversation graph generated by a machine learning system, according to some example embodiments.

FIG. 3 is a diagram illustrating an example of a portion of a graph data structure for modelling a conversation graph generated by a machine learning system, according to some example embodiments. As illustrated in FIG. 3, the graph data structure 300 consists of nodes connected by edges. For instance, the node with reference number 301 is connected to the node with reference number 303 by means of the edge with reference number 302. Each node in the graph data structure 300 represents an interactive dialogue (e.g., one or more sets of an incentive content item, a call-to-action content item, and a reward content item) in the conversation graph. The edge that connects any two nodes may represent a transition between two interactive dialogues. In some instances a first interactive dialogue (e.g., dialogue 301) corresponds to a first software module that provides digital content pertaining to a first topic (e.g., building skills pertaining to Software Engineering), and a second interactive dialogue (e.g., dialogue 303) corresponds to a second software module that provides digital content pertaining to a second topic (e.g., building skills pertaining to Data Science). In some instances a first interactive dialogue (e.g., dialogue 301) corresponds to a first software module that guides a user through improving the user's profile on the online system, and a second interactive dialogue (e.g., dialogue 303) corresponds to a second software module that guides a user through applying for a job to a certain company.

In some example embodiments, the machine learning system generates a conversation graph for a user of the online system, and associates the conversation graph with a user identifier of the user in database. The conversation graph represents a personalized conversational flow for sequenced delivery of digital content to a client device associated with the user identifier. The conversation graph includes a plurality of nodes (e.g., nodes 301, 303, 304, 305, 306, 307, and 308, as illustrated in FIG. 3) that represent a plurality of interactive dialogues between a machine and a user associated with the user identifier. The conversation graph includes one or more edges e.g., edge 302) that connect the plurality of nodes. The one or more edges represent one or more transitions between the plurality of interactive dialogues.

In various example embodiments, the conversation graph includes one or more classes (e.g., clusters) of nodes. A class of nodes of the one or more classes of nodes may represent a topic associated with the personalized conversational flow, and each node in the class may represent a particular sub-topic associated with the topic. For example, as illustrated in FIG. 3, nodes 304, 305, 306, and 307 may be included in a first class of nodes, and nodes 301 and 303 may be included in a second class of nodes.

According to certain example embodiments, the machine learning system, using one or more machine learning algorithms, generates, for each node included in the class of nodes, a user-action-based score value based on one or more indications of actions received from the client device in response to one or more content items displayed in the user interface on the client device. The machine learning system ranks the nodes included in the class of nodes based on the user-action-based score values. The machine learning system selects, from the class of nodes, a further node to which to transition in the conversation flow based on the ranking of the nodes included in the class of nodes. The further node represents an incentive content item associated with a further interactive dialogue.

In some example embodiments, the user-action-based score value represents a probability that the user would perform a particular action in response to a particular call-to-action content item associated with a particular node. The probability is computed using the one or more machine learning algorithms. In some instances, the probabilities associated with the nodes are fixed values that do not change over time.

In some instances, the probabilities associated with the nodes may change over time. The probability is re-computed after receiving one or more indications of actions from the client device in response to one or more content items displayed in the user interface on the client device.

Figure 4:
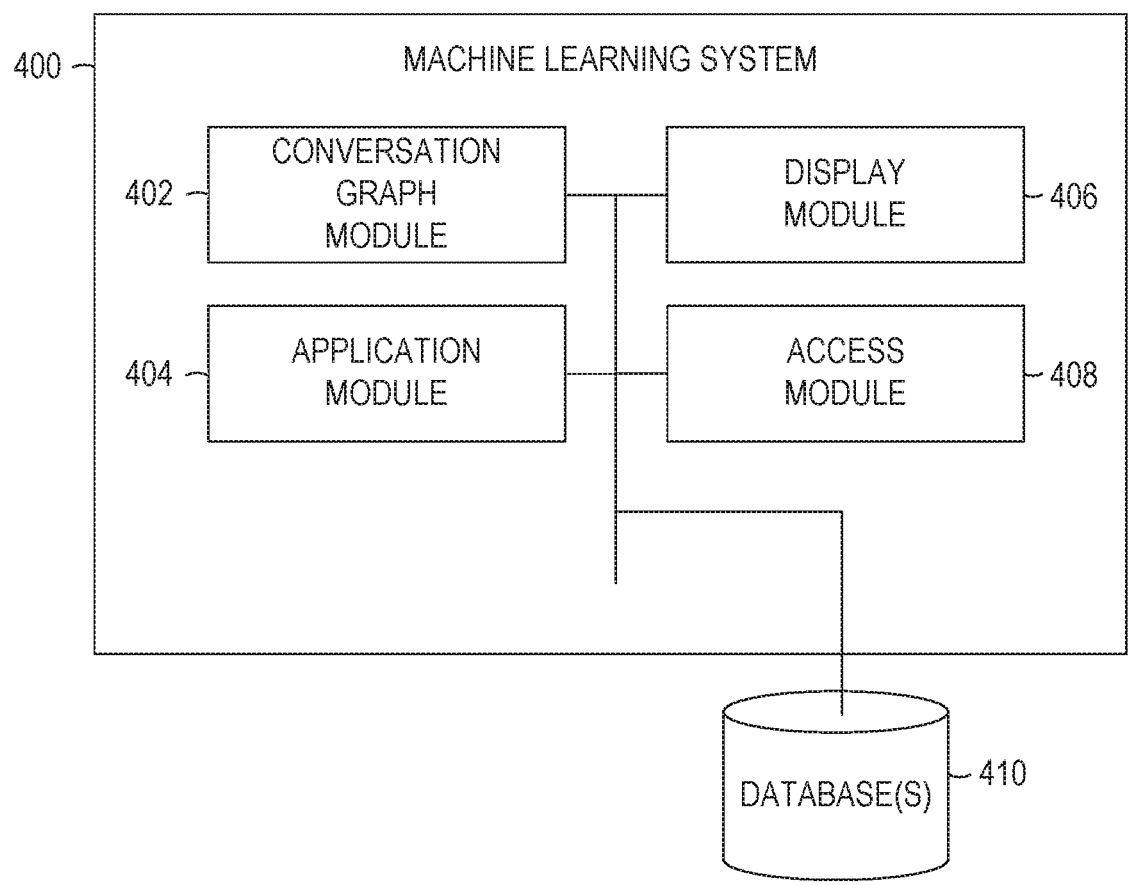
FIG. 4 is a block diagram illustrating components of a machine learning system, according to some example embodiments.

FIG. 4 is a block diagram illustrating components of the machine learning system 400, according to some example embodiments. As shown in FIG. 4, the machine learning system 400 includes a conversation graph module 402, an application module 404, a display module 406, and an access module 408, all configured to communicate with each other (e.g., via a bus, shared memory, or a switch).

According to some example embodiments, the conversation graph module 402 generates a conversation graph associated with a user identifier. The user identifier serves to identify a particular user of an online system. The conversation graph represents a personalized conversational flow for sequenced delivery of digital content to a client device associated with the user identifier. The conversation graph includes a plurality of nodes that represent a plurality of interactive dialogues between a machine and a user associated with the user identifier. The conversation graph includes one or more edges that connect the plurality of nodes. The one or more edges represent one or more transitions between the plurality of interactive dialogues.

The application module 404 executes a software application. The executing of the software application is based on a signal that indicates an online job-seeking activity by a user associated with the user identifier. The signal is received, by the access module 408, from the client device associated with the user identifier. In some example embodiments, the software application is a job-seeker coach bot that assists a user to find a job via an online system, such as a social networking service. The executing of the software application results in generating and causing display, by the display module 406, of a user interface on the client device. The user interface including a prompt related to job-seeking guidance for the user.

The conversation graph module 402, based on an indication of a first action, by the user, received by the access module 408 from the client device in response to the prompt, dynamically adjusts the conversation graph associated with the user identifier. The dynamic adjusting includes selecting a first node of the conversation graph based on the first action. The first node represents a starting point for the personalized conversation flow for the sequenced delivery of digital content to the client device.

The display module 406, based on the dynamic adjusting of the conversation graph, generates and causes display, in the user interface, of a first incentive content item associated with a first interactive dialogue represented by the first node of the conversation graph, and a first call-to-action content item associated with the first incentive content item.

The conversation graph module 402, in response to a further indication of a second action received from the client device in response to the first call-to action content item, dynamically selects a particular edge connecting the first node and a further node (e.g., a second node, an additional node, etc.) in the conversation graph. The dynamic selecting of the particular edge results in generating and causing display by the display module 406, in the user interface, of a further incentive content item associated with a further interactive dialogue represented by the further node of the conversation graph, and a further call-to-action content item associated with the further incentive content item.

The access module 408 accesses (e.g., receives) various data from a record of a database (e.g., database 410) associated with an online system, such as social networking system 120, from a client device, such as client device 150, or from a third party machine, such as third party server 146.

To perform one or more of its functionalities, the machine learning system 400 may communicate with one or more other systems. For example, an integration system may integrate the machine learning system 400 with one or more email servers, web servers, one or more databases, or other servers, systems, or repositories.

Any one or more of the modules described herein may be implemented using hardware (e.g., one or more processors of a machine) or a combination of hardware and software. For example, any module described herein may configure a hardware processor (e.g., among one or more hardware processors of a machine) to perform the operations described herein for that module. In some example embodiments, any one or more of the modules described herein may comprise one or more hardware processors and may be configured to perform the operations described herein. In certain example embodiments, one or more hardware processors are configured to include any one or more of the modules described herein.

Moreover, any two or more of these modules may be combined into a single module, and the functions described herein for a single module may be subdivided among multiple modules. Furthermore, according to various example embodiments, modules described herein as being implemented within a single machine, database, or device may be distributed across multiple machines, databases, or devices. The multiple machines, databases, or devices are communicatively coupled to enable communications between the multiple machines, databases, or devices. The modules themselves are communicatively coupled (e.g., via appropriate interfaces) to each other and to various data sources, so as to allow information to be passed between the applications so as to allow the applications to share and access common data. Furthermore, the modules may access one or more databases 410 (e.g., database 128, 130, 132, 136, or 138).

Figure 5:
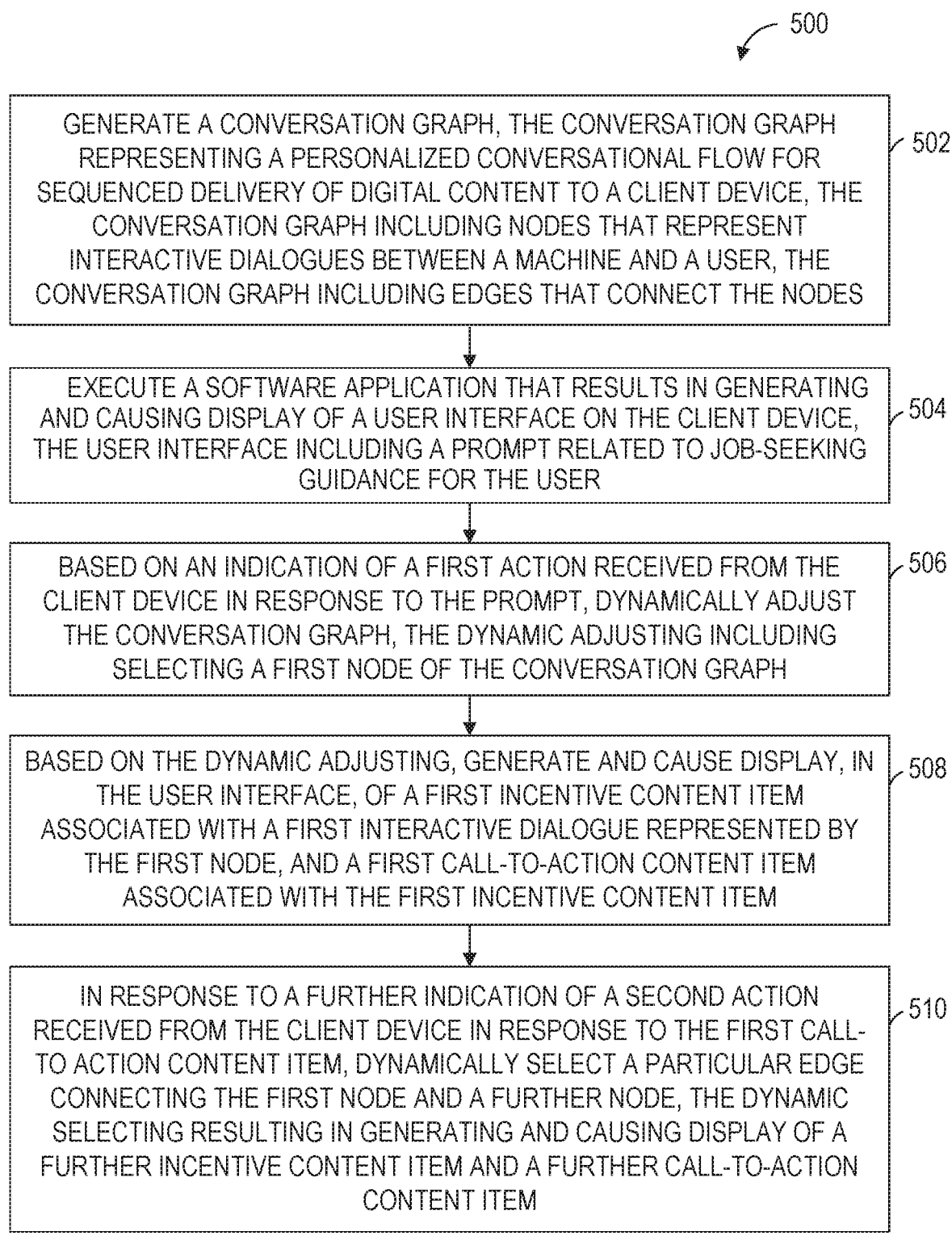
FIG. 5 is a flowchart illustrating a method for conversation graph learning to improve digital content delivery, according to some example embodiments.

FIGS. 5-9 are flowcharts illustrating a method for improving digital content delivery based on a conversation graph dynamically generated using machine learning algorithms, according to some example embodiments. Operations in the method 500 illustrated in FIG. 5 may be performed using modules described above with respect to FIG. 4. As shown in FIG. 5, method 500 may include one or more of method operations 502, 504, 506, 508, and 510, according to some example embodiments.

At operation 502, the conversation graph module 402 generates a conversation graph associated with a user identifier. The conversation graph represents a personalized conversational flow for sequenced delivery of digital content to a client device associated with the user identifier. The conversation graph includes a plurality of nodes that represent a plurality of interactive dialogues between a machine and a user associated with the user identifier. The conversation graph includes one or more edges that connect the plurality of nodes. The one or more edges represent one or more transitions between the plurality of interactive dialogues.

In various example embodiments, the conversation graph module 402 determines that a job seeker score value associated with the user identifier exceeds a job-seeker threshold value. The generating of the conversation graph, by the conversation graph module 402, is based on the determining that the job seeker score value exceeds the job-seeker threshold value.

At operation 504, the application module 404 executes a software application. The executing of the software application is based on a signal that indicates an online job-seeking activity and that is received, by the access module 408, from the client device. The executing of the software application results in generating and causing display, by the display module 406, of a user interface on the client device. The user interface includes a prompt related to job-seeking guidance for the user.

At operation 506, the conversation graph module 402 dynamically adjusts the conversation graph associated with the user identifier. The dynamic adjusting of the conversation graph is based on an indication of a first action, by the user, received by the access module 408 from the client device in response to the prompt. The dynamic adjusting includes selecting a first node of the conversation graph based on the first action.

According to some example embodiments, the indication of the first action includes a selection of a user interface element in the user interface associated with the online service, via the client device. The user interface element may indicate a particular context (e.g., a company web page, a web page to enhance a user profile, a web page pertaining to making new social networking connections, a web page to generate a job application, etc.) associated with the online service. The first node represents a particular interactive dialogue pertaining to the particular context. For example, one of a plurality of interactive dialogues associated with the context of improving a user profile may guide the user through posting a user's picture in the context of improving the user profile of the user.

At operation 508, the display module 406 generates and causes display, in the user interface, of a first incentive content item associated with a first interactive dialogue represented by the first node of the conversation graph, and a first call-to-action content item associated with the first incentive content item. The generating and causing of the first incentive content item and the first call-to-action content item are based on the dynamic adjusting of the conversation graph.

At operation 510, the conversation graph module 402 dynamically selects a particular edge connecting the first node and a further node in the conversation graph. The dynamic selecting of the particular edge is performed in response to a further indication of a second action received, by the access module 408, from the client device in response to the first call-to action content item. The dynamic selecting of the particular edge results in generating and causing display by the display module 406, in the user interface, of a further incentive content item associated with a further interactive dialogue represented by the further node of the conversation graph, and a further call-to-action content item associated with the further incentive content item.

In some example embodiments, the user is a member of a Social Networking Service (SNS). The plurality of interactive dialogues are presented in the personalized conversational flow for sequenced delivery of digital content to the client device in a particular sequence determined based on a particular online context associated with the SNS.

In certain example embodiments, each of the plurality of nodes included in the conversation graph is associated with a score value. The score value identifies a level of the user's interest in the interactive dialogue (e.g., the content included in or the topic associated with the interactive dialogue) represented by a particular node. The dynamic selecting of the particular edge connecting the first node and the further node in the conversation graph is based on the score value associated with the further node ranking higher than other score values associated with other nodes. In some example embodiments, the score value is generated based on one or more actions, by the user, pertaining to at least one of one or more digital content items published on a server of an online service or one or more interactive dialogues associated with the conversation graph. In various example embodiments, the score values of the plurality of nodes are dynamically re-computed based on one or more actions, by the user, pertaining to one or more interactive dialogues.

Further details with respect to the method operations of the method 500 are described below with respect to FIGS. 6-9.

Figure 6:
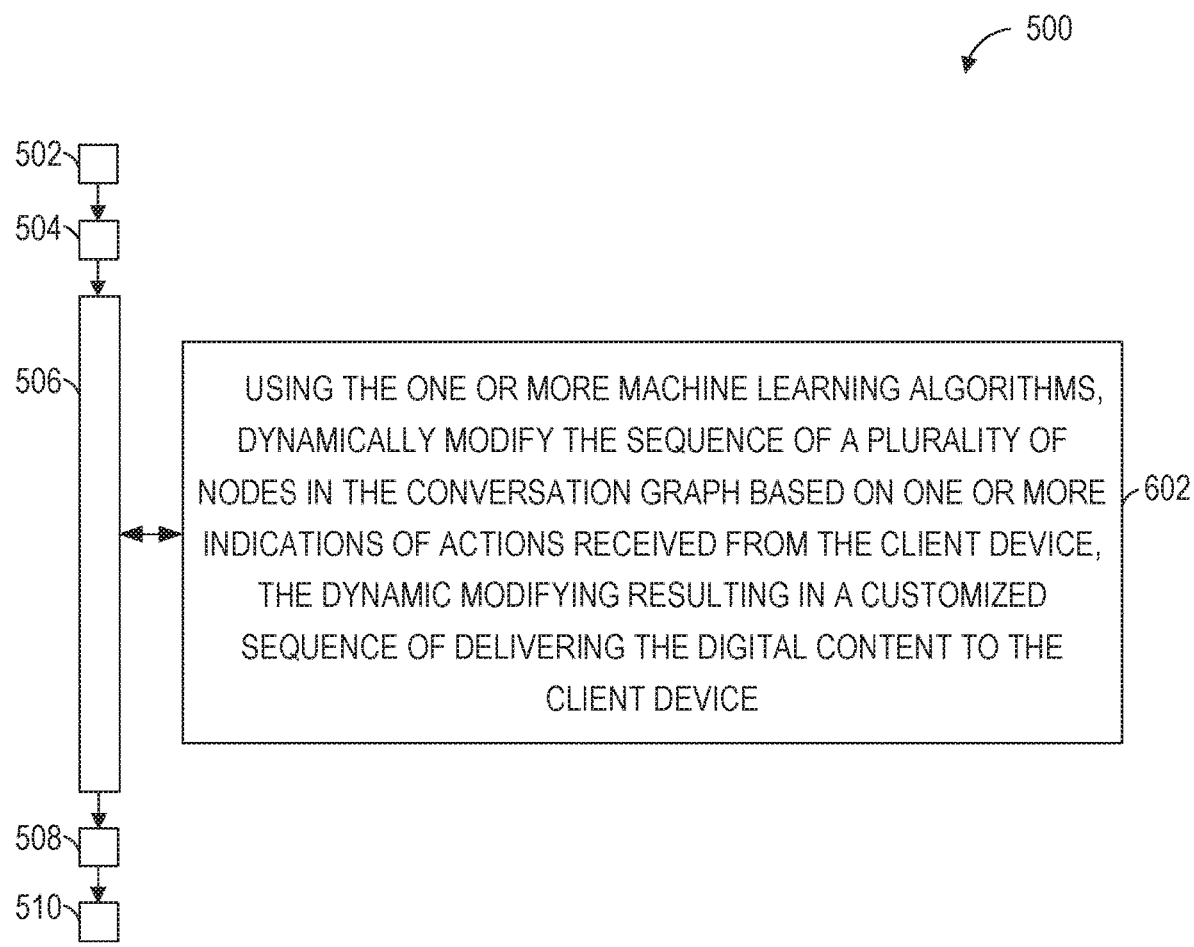
FIG. 6 is a flowchart illustrating a method for conversation graph learning to improve digital content delivery, and representing step 506 of FIG. 5 in more detail, according to some example embodiments.

As shown in FIG. 6, the method 500 includes operation 602, according to some example embodiments. Operation 602 may be performed as part (e.g., a precursor task, a subroutine, or a portion) of operation 506 of FIG. 5, in which the conversation graph module 402 dynamically adjusts the conversation graph associated with the user identifier.

Figure 7:
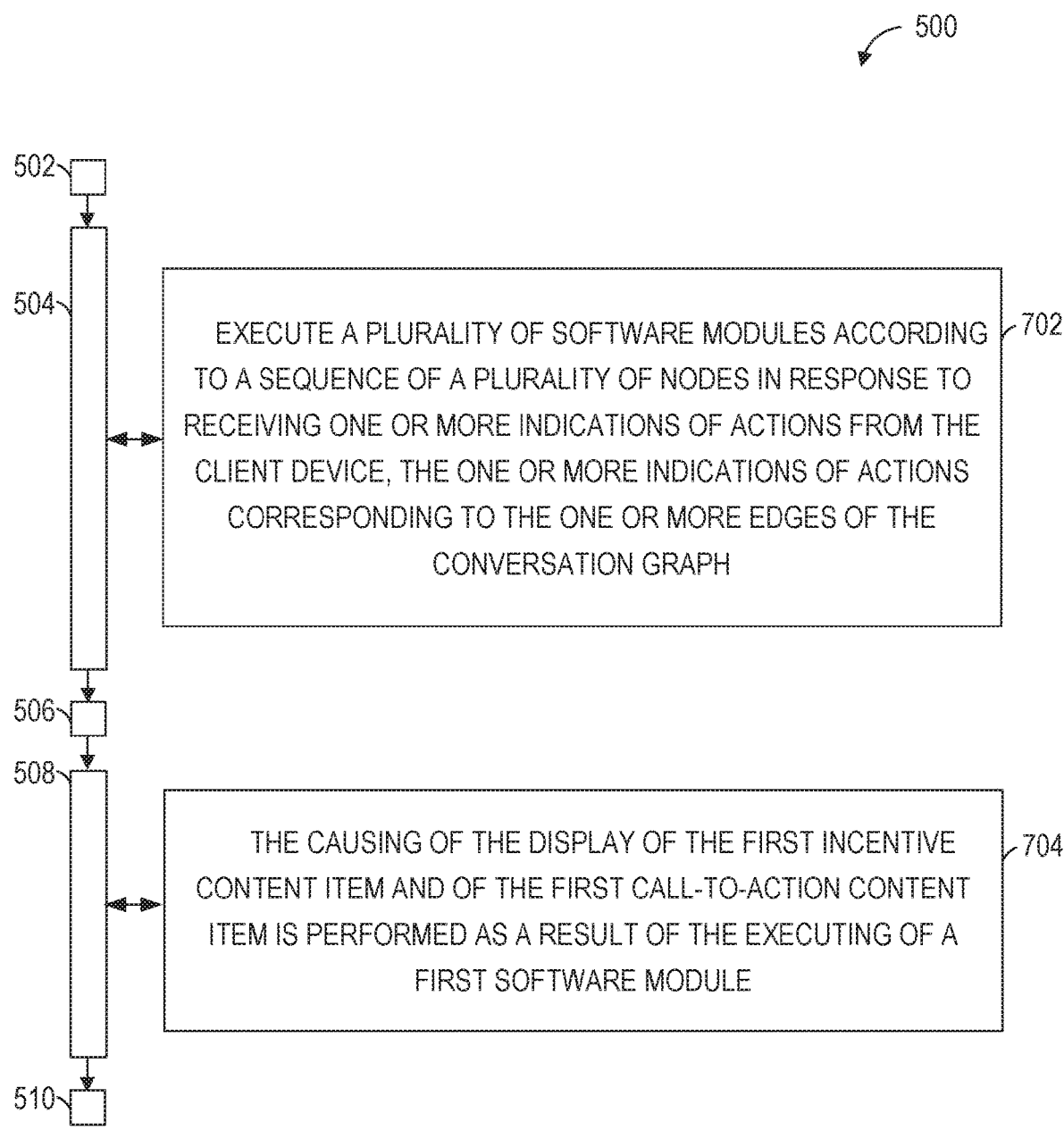
FIG. 7 is a flowchart illustrating a method for conversation graph learning to improve digital content delivery, and representing steps 504 and 508 of FIG. 5 in more detail, according to some example embodiments.

At operation 602, the conversation graph module 402, using the one or more machine learning algorithms, dynamically modifies the sequence of the plurality of nodes in the conversation graph based on the one or more indications of actions received from the client device. The dynamic modifying of the sequence of the plurality of nodes in the conversation graph results in a customized sequence of delivering the digital content to the client device As shown in FIG. 7, the method 500 may include one or more of operations 702 or 704, according to some example embodiments. In some example embodiments, the plurality of interactive dialogues represented by the plurality of the nodes of the conversation graph correspond to a plurality of software modules associated with the software application.

Operation 702 may be performed as part (e.g., a precursor task, a subroutine, or a portion) of operation 504 of FIG. 5, in which the application module 404 executes a software application. At operation 702, the application module 404 executes the plurality of software modules according to a sequence of the plurality of nodes associated with the conversation graph in response to receiving one or more indications of actions from the client device. The one or more indications of actions correspond to the one or more edges of the conversation graph. The executing of the plurality of software modules results in the sequenced delivery of digital content associated with the plurality of the software modules to the client device.

Operation 704 may be performed as part (e.g., a precursor task, a subroutine, or a portion) of operation 508 of FIG. 5, in which the display module 406 generates and causes display, in the user interface, of a first incentive content item associated with a first interactive dialogue represented by the first node of the conversation graph, and a first call-to-action content item associated with the first incentive content item. At operation 704, the causing of the display of the first incentive content item and of the first call-to-action content item, by the display module 406, is performed as a result of the executing of a first software module.

Figure 8:
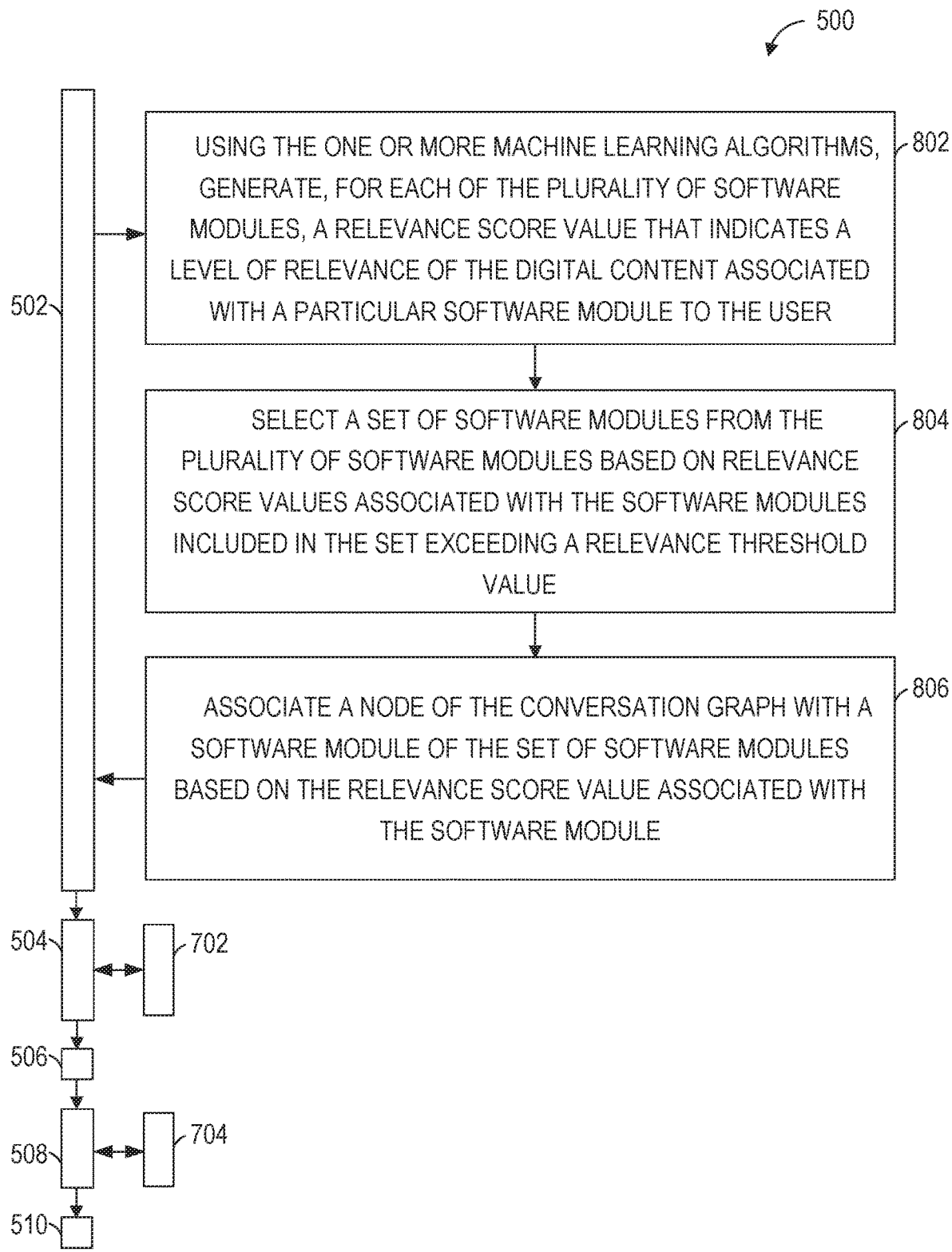
FIG. 8 is a flowchart illustrating a method for conversation graph learning to improve digital content delivery, and representing step 502 of FIG. 7 in more detail, according to some example embodiments.

As shown in FIG. 8, the method 500 may include one or more of operation 802, 804, or 806, according to some example embodiments. Operation 802 may be performed as part (e.g., a precursor task, a subroutine, or a portion) of operation 502 of FIG. 5, in which the conversation graph module 402 generates a conversation graph associated with a user identifier. At operation 802, the conversation graph module 402 generates, for each of the plurality of software modules, a relevance score value. The relevance score value indicates a level of relevance of the digital content associated with a particular software module to the user. The conversation graph module 402 generates the relevance score value using the one or more machine learning algorithms.

Operation 8004 may be performed after operation 802. At operation 804, the conversation graph module 402 selects a set of software modules from the plurality of software modules. The selecting of the set of software modules is based on the relevance score values associated with the software modules included in the set exceeding a relevance threshold value. The relevance threshold value may be pre-determined (e.g., provided) by an administrator (e.g., an engineer), and may be stored in a database record.

Operation 8006 may be performed after operation 804. At operation 806, the conversation graph module 402 associates a node of the conversation graph with a software module of the set of software modules based on the relevance score value associated with the software module.

In some example embodiments, the user is a member of a Social Networking Service (SNS). The relevance score value associated with the particular software module is determined based on at least one of member profile data associated with the member, member activity and behavior data associated with the member, social graph data associated with the member, job migration data associated with one or more members of the SNS, or company migration data associated with one or more members.

In certain example embodiments, the conversation graph module 402 weights the relevance score values associated with the software modules included in the set based on the one or more indications of actions received from the client device. The weighting may be performed, by the conversation graph module 402, using the one or more machine learning algorithms. The weighting of the relevance score values results in weighted relevance score values associated with the software modules.

The conversation graph module 402 dynamically modifies the sequence of the plurality of nodes in the conversation graph based on the weighted relevance score values associated with the software modules. The dynamic modifying of the sequence of the plurality of nodes may be performed, by the conversation graph module 402, using the one or more machine learning algorithms. The dynamic modifying results in a customized sequence of delivering the digital content to the client device.

Figure 9:
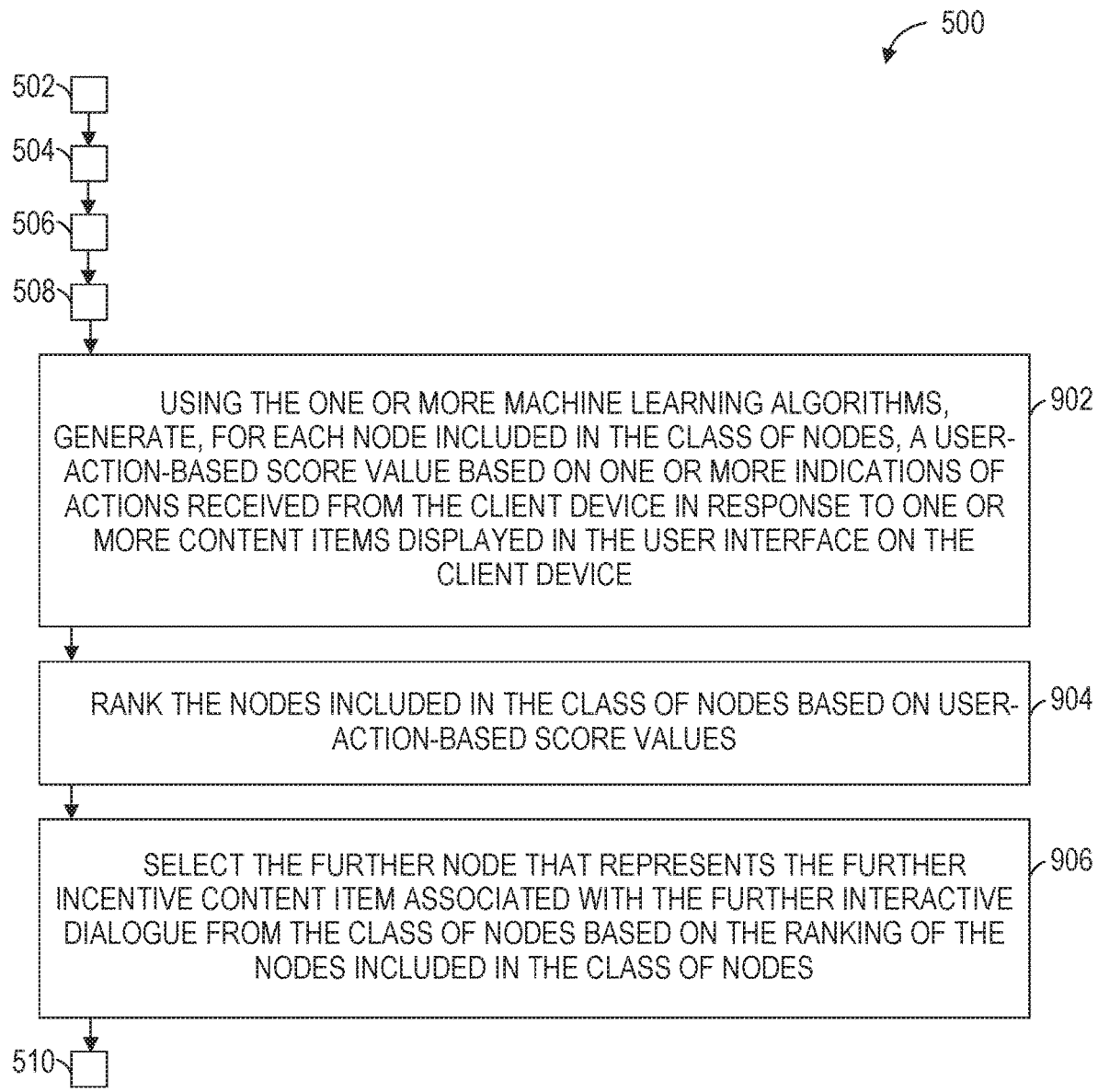
FIG. 9 is a flowchart illustrating a method for conversation graph learning to improve digital content delivery, and representing additional steps of the method illustrated in FIG. 5, according to some example embodiments.

As shown in FIG. 9, the method 500 may include one or more of operation 902, 904, or 906, according to some example embodiments. In some example embodiments, the conversation graph includes one or more classes of nodes. A class of nodes of the one or more classes of nodes represents a topic associated with the personalized conversational flow.

Operation 902 may be performed after operation 508 of FIG. 5, in which the display module 406 generates and causes display, in the user interface, of a first incentive content item associated with a first interactive dialogue represented by the first node of the conversation graph, and a first call-to-action content item associated with the first incentive content item. At operation 902, the conversation graph module 402 generates, for each node included in the class of nodes, a user-action-based score value based on one or more indications of actions received from the client device in response to one or more content items displayed in the user interface on the client device. The conversation graph module 402 generates the user-action-based score value using the one or more machine learning algorithms.

Operation 904 may be performed after operation 902. At operation 904, the conversation graph module 402 ranks the nodes included in the class of nodes based on the user-action-based score values.

Operation 906 may be performed after operation 904. At operation 906, the conversation graph module 402 selects the further node that represents the further incentive content item associated with the further interactive dialogue from the class of nodes based on the ranking of the nodes included in the class of nodes.

In some example embodiments, the user-action-based score value represents a probability that the user would perform a particular action in response to a particular call-to action content item associated with a particular node. The probability is computed using the one or more machine learning algorithms. The probability is re-computed after receiving one or more indications of actions from the client device in response to one or more content items displayed in the user interface on the client device.

Modules, Components and Logic

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is a tangible unit capable of performing certain operations and may be configured or arranged in a certain manner. In example embodiments, one or more computer systems (e.g., a standalone, client or server computer system) or one or more processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses that connect the hardware-implemented modules). In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors or processor-implemented modules, not only residing within a single machine, but deployed across a number of machines. In some example embodiments, the one or more processors or processor-implemented modules may be located in a single location (e.g., within a home environment, an office environment or as a server farm), while in other embodiments the one or more processors or processor-implemented modules may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

Electronic Apparatus and System

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry, e.g., a field programmable gate array (FPGA) or an application-specific integrated circuit (ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Example Machine Architecture and Machine-Readable Medium

Figure 10:
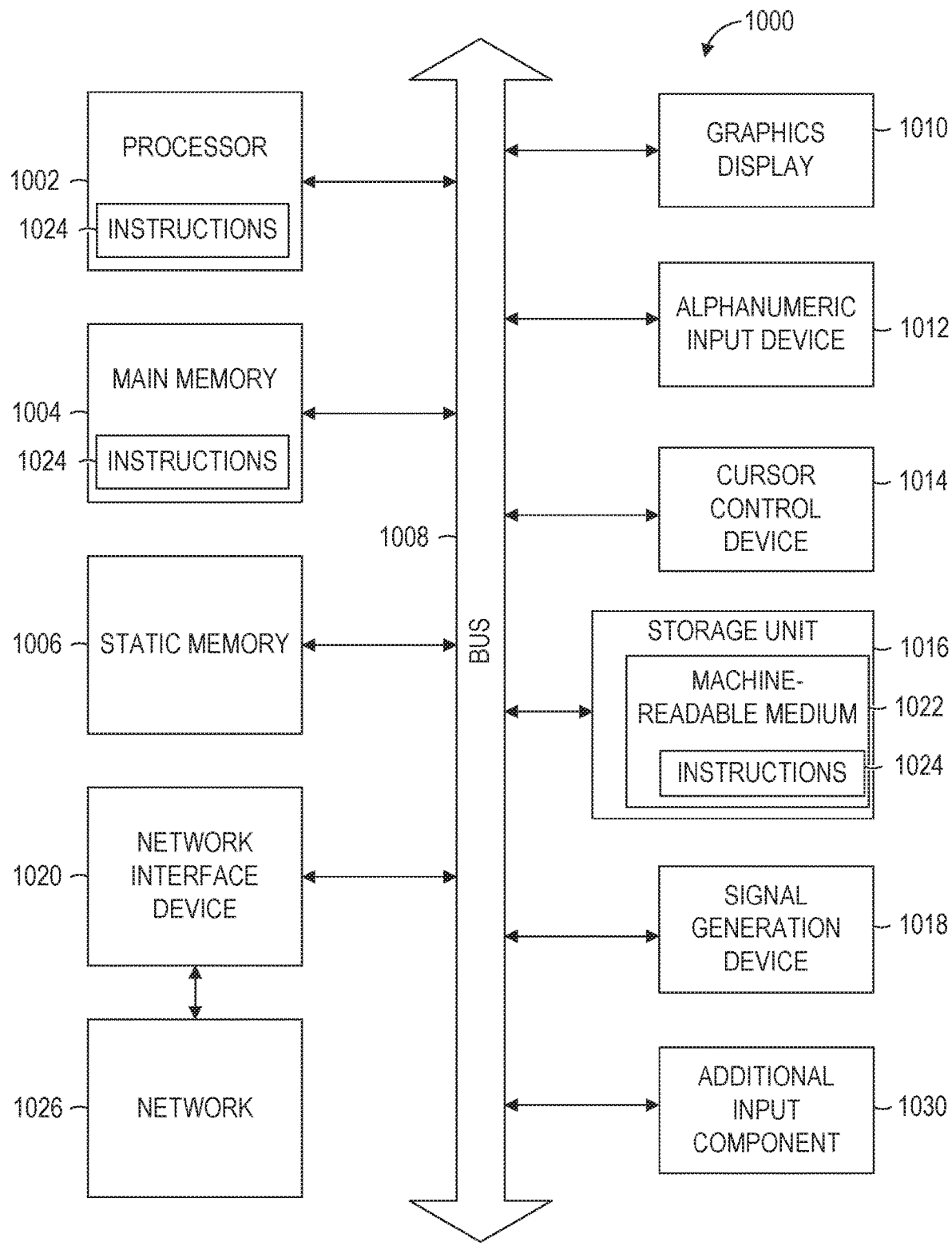
FIG. 10 is a block diagram illustrating components of a machine, according to some example embodiments, able to read instructions from a machine-readable medium and perform any one or more of the methodologies discussed herein.

FIG. 10 is a block diagram illustrating components of a machine 1000, according to some example embodiments, able to read instructions 1024 from a machine-readable medium 1022 (e.g., a non-transitory machine-readable medium, a machine-readable storage medium, a computer-readable storage medium, or any suitable combination thereof) and perform any one or more of the methodologies discussed herein, in whole or in part. Specifically, FIG. 10 shows the machine 1000 in the example form of a computer system (e.g., a computer) within which the instructions 1024 (e.g., software, a program, an application, an applet, an app, or other executable code) for causing the machine 1000 to perform any one or more of the methodologies discussed herein may be executed, in whole or in part.

In alternative embodiments, the machine 1000 operates as a standalone device or may be connected (e.g., networked) to other machines. In a networked deployment, the machine 1000 may operate in the capacity of a server machine or a client machine in a server-client network environment, or as a peer machine in a distributed (e.g., peer-to-peer) network environment. The machine 1000 may be a server computer, a client computer, a personal computer (PC), a tablet computer, a laptop computer, a netbook, a cellular telephone, a smartphone, a set-top box (STB), a personal digital assistant (PDA), a web appliance, a network router, a network switch, a network bridge, or any machine capable of executing the instructions 1024, sequentially or otherwise, that specify actions to be taken by that machine. Further, while only a single machine is illustrated, the term "machine" shall also be taken to include any collection of machines that individually or jointly execute the instructions 1024 to perform all or part of any one or more of the methodologies discussed herein.

The machine 1000 includes a processor 1002 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 1004, and a static memory 1006, which are configured to communicate with each other via a bus 1008. The processor 1002 may contain microcircuits that are configurable, temporarily or permanently, by some or all of the instructions 1024 such that the processor 1002 is configurable to perform any one or more of the methodologies described herein, in whole or in part. For example, a set of one or more microcircuits of the processor 1002 may be configurable to execute one or more modules (e.g., software modules) described herein.

The machine 1000 may further include a graphics display 1010 (e.g., a plasma display panel (PDP), a light emitting diode (LED) display, a liquid crystal display (LCD), a projector, a cathode ray tube (CRT), or any other display capable of displaying graphics or video). The machine 1000 may also include an alphanumeric input device 1012 (e.g., a keyboard or keypad), a cursor control device 1014 (e.g., a mouse, a touchpad, a trackball, a joystick, a motion sensor, an eye tracking device, or other pointing installment), a storage unit 1016, an audio generation device 1018 (e.g., a sound card, an amplifier, a speaker, a headphone jack, or any suitable combination thereof), and a network interface device 1020.

The storage unit 1016 includes the machine-readable medium 1022 (e.g., a tangible and non-transitory machine-readable storage medium) on which are stored the instructions 1024 embodying any one or more of the methodologies or functions described herein. The instructions 1024 may also reside, completely or at least partially, within the main memory 1004, within the processor 1002 (e.g., within the processor's cache memory), or both, before or during execution thereof by the machine 1000. Accordingly, the main memory 1004 and the processor 1002 may be considered machine-readable media (e.g., tangible and non-transitory machine-readable media). The instructions 1024 may be transmitted or received over the network 1026 via the network interface device 1020. For example, the network interface device 1020 may communicate the instructions 1024 using any one or more transfer protocols (e.g., hypertext transfer protocol (HTTP)).

In some example embodiments, the machine 1000 may be a portable computing device, such as a smart phone or tablet computer, and have one or more additional input components 1030 (e.g., sensors or gauges). Examples of such input components 1030 include an image input component (e.g., one or more cameras), an audio input component (e.g., a microphone), a direction input component (e.g., a compass), a location input component (e.g., a global positioning system (GPS) receiver), an orientation component (e.g., a gyroscope), a motion detection component one or more accelerometers), an altitude detection component (e.g., an altimeter), and a gas detection component (e.g., a gas sensor). Inputs harvested by any one or more of these input components may be accessible and available for use by any of the modules described herein.

As used herein, the term "memory" refers to a machine-readable medium able to store data temporarily or permanently and may be taken to include but not be limited to, random-access memory (RAM), read-only memory (ROM), buffer memory, flash memory, and cache memory. While the machine-readable medium 1022 is shown in an example embodiment to be a single medium, the term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing the instructions 1024 for execution by the machine 1000, such that the instructions 1024, when executed by one or more processors of the machine 1000 (e.g., processor 1002), cause the machine 1000 to perform any one or more of the methodologies described herein, in whole or in part. Accordingly, a "machine-readable medium" refers to a single storage apparatus or device, as well as cloud-based storage systems or storage networks that include multiple storage apparatus or devices. The term "machine-readable medium" shall accordingly be taken to include, but not be limited to, one or more tangible (e.g., non-transitory) data repositories in the form of a solid-state memory, an optical medium, a magnetic medium, or any suitable combination thereof.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute software modules (e.g., code stored or otherwise embodied on a machine-readable medium or in a transmission medium), hardware modules, or any suitable combination thereof. A "hardware module" is a tangible (e.g., non-transitory) unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, and such a tangible entity may be physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software (e.g., a software module) may accordingly configure one or more processors, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The performance of certain operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of the subject matter discussed herein may be presented in terms of algorithms or symbolic representations of operations on data stored as bits or binary digital signals within a machine memory (e.g., a computer memory). Such algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

What is claimed is:

1. A method comprising:
   generating a personalized conversation graph associated with a user identifier, the personalized conversation graph representing a conversational flow for sequenced deliverable digital content to a client device associated with the user identifier, the personalized conversation graph including a plurality of nodes that represent a plurality of interactive dialogues for presenting to a user associated with the user identifier by a software application executing at a computer, the personalized conversation graph including one or more edges that connect the plurality of nodes, the one or more edges representing one or more transitions between the plurality of interactive dialogues, the generating of the personalized conversation graph being performed using one or more machine learning algorithms and one or more hardware processors;
   based on a signal that indicates an online job-seeking activity and that is received from the client device, executing the software application to generate and cause display of a user interface on the client device, the user interface including a prompt related to job-seeking guidance for the user;
   based on an indication of a first action, by the user, received from the client device in response to the prompt, selecting and processing a first node of the personalized conversation graph;
   to cause display, in the user interface, of a first incentive content item associated with a first interactive dialogue represented by the first node of the personalized conversation graph, and a first call-to-action content item associated with the first incentive content item; and
   in response to a further indication of a second action received from the client device in response to the first call-to action content item, selecting and processing a second node, connected via an edge to the first node, in the personalized conversation graph, to cause display, in the user interface, of a further incentive content item associated with a further interactive dialogue represented by the second node of the personalized conversation graph, and a further call-to-action content item associated with the further incentive content item.

2. The method of claim 1, further comprising
   using the one or more machine learning algorithms, dynamically modifying the sequence of the plurality of nodes in the personalized conversation graph based on the one or more indications of actions received from the client device, the dynamic modifying resulting in a customized sequence of delivering the digital content to the client device.

3. The method of claim 1, wherein the plurality of interactive dialogues represented by the plurality of the nodes of the personalized conversation graph correspond to a plurality of software modules associated with the software application, wherein the executing of the software application includes:
   executing the plurality of software modules according to a sequence of the plurality of nodes associated with the personalized conversation graph in response to receiving one or more indications of actions from the client device, the one or more indications of actions corresponding to the one or more edges of the personalized conversation graph, the executing of the plurality of software modules resulting in the sequenced delivery of digital content associated with the plurality of the software modules to the client device, and
   wherein the causing of the display of the first incentive content item and of the first call-to-action content item is performed as a result of the executing of a first software module.

4. The method of claim 3, wherein the generating of the personalized conversation graph associated with the user identifier includes:
   using the one or more machine learning algorithms, generating, for each of the plurality of software modules, a relevance score that indicates a level of relevance of the digital content associated with a particular software module to the user;
   selecting a set of software modules from the plurality of software modules based on relevance scores associated with the software modules included in the set exceeding a relevance threshold; and
   associating a node of the personalized conversation graph with a software module of the set of software modules based on the relevance score associated with the software module.

5. The method of claim 4, wherein the user is a member of a Social Networking Service (SNS), and
   wherein the relevance score associated with the particular software module is determined based on at least one of member profile data associated with the member, member activity and behavior data associated with the member, social graph data associated with the member, job migration data associated with one or more members of the SNS, or company migration data associated with one or more members.

6. The method of claim 4, further comprising:
   using the one or more machine learning algorithms, weighting the relevance scores associated with the software modules included in the set based on the one or more indications of actions received from the client device, the weighting of the relevance scores resulting in weighted relevance scores associated with the software modules; and using the one or more machine learning algorithms, dynamically modifying the sequence of the plurality of nodes in the personalized conversation graph based on the weighted relevance scores associated with the software modules, the dynamic modifying resulting in a customized sequence of delivering the digital content to the client device.

7. The method of claim 1, wherein the personalized conversation graph includes one or more classes of nodes, and wherein a class of nodes of the one or more classes of nodes represents a topic associated with the personalized conversational flow, the method further comprising:

using the one or more machine learning algorithms, generating, for each node included in the class of nodes, a user-action-based score based on one or more indications of actions received from the client device in response to one or more content items displayed in the user interface on the client device;

ranking the nodes included in the class of nodes based on the user-action-based scores; and selecting the second node that represents the further incentive content item associated with the further interactive dialogue from the class of nodes based on the ranking of the nodes included in the class of nodes.

8. The method of claim 7, wherein the user-action-based score represents a probability that the user would perform a particular action in response to a particular call-to action content item associated with a particular node, the probability being computed using the one or more machine learning algorithms, and wherein the probability is re-computed after receiving one or more indications of actions from the client device in response to one or more content items displayed in the user interface on the client device.

9. The method of claim 1, wherein the user is a member of a Social Networking Service (SNS), and wherein the plurality of interactive dialogues are presented in the conversational flow for sequenced delivery of digital content to the client device in a particular sequence determined based on a particular online context associated with the SNS.

10. The method of claim 1, further comprising:
determining that a job seeker score associated with the user identifier exceeds a job-seeker threshold,
wherein the generating of the personalized conversation graph is based on the determining that the job seeker score value exceeds the job-seeker threshold.

11. The method of claim 1, wherein each of the plurality of nodes is associated with a score identifying a level of the user's interest in the interactive dialogue represented by a particular node, and wherein the selecting and processing of the second node in the personalized conversation graph is based on the score associated with the second node ranking higher than other scores values with other nodes.

12. The method of claim 11, wherein the score is generated based on one or more actions, by the user, pertaining to at least one of one or more digital content items published on a server of an online service or one or more interactive dialogues associated with the personalized conversation graph.

13. The method of claim 11, wherein the scores of the plurality of nodes are dynamically re-computed based on one or more actions, by the user, pertaining to one or more interactive dialogues.

14. The method of claim 1, wherein the indication of the first action includes a selection of a user interface element in the user interface associated with the online service, via the client device, the user interface element indicating a particular context associated with the online service, and wherein the first node represents a particular interactive dialogue pertaining to the particular context.

15. A system comprising:
one or more hardware processors; and
a machine-readable medium for storing instructions that, when executed by the one or more hardware processors, cause the one or more hardware processors to perform operations comprising:

generating a personalized conversation graph associated with a user identifier, the personalized conversation graph representing a conversational flow for sequenced deliverable digital content to a client device associated with the user identifier, the personalized conversation graph including a plurality of nodes that represent a plurality of interactive dialogues for presenting to a user associated with the user identifier by a software application executing at a computer, the personalized conversation graph including one or more edges that connect the plurality of nodes, the one or more edges representing one or more transitions between the plurality of interactive dialogues;

based on a signal that indicates an online job-seeking activity and that is received from the client device, executing the software application to generate and cause display of a user interface on the client device, the user interface including a prompt related to job-seeking guidance for the user;

based on an indication of a first action, by the user, received from the client device in response to the prompt, selecting and processing a first node of the personalized conversation graph to cause display, in the user interface, of a first incentive content item associated with a first interactive dialogue represented by the first node of the personalized conversation graph, and a first call-to-action content item associated with the first incentive content item; and in response to a further indication of a second action received from the client device in response to the first call-to action content item, selecting and processing a second node in the conversation graph to cause display, in the user interface, of a further incentive content item associated with a further interactive dialogue represented by the second node of the personalized conversation graph, and a further call-to-action content item associated with the further incentive content item.

16. A non-transitory machine-readable storage medium comprising computer instructions that, when executed by one or more hardware processors of a machine, cause the one or more hardware processors to perform operations comprising:

generating a personalized conversation graph associated with a user identifier, the personalized conversation graph representing a conversational flow for sequenced deliverable digital content to a client device associated with the user identifier, the personalized conversation graph including a plurality of nodes that represent a plurality of interactive dialogues between a machine and a user associated with the user identifier, the personalized conversation graph including one or more edges that connect the plurality of nodes, the one or more edges representing one or more transitions between the plurality of interactive dialogues;

based on a signal that indicates an online job-seeking activity and that is received from the client device, executing the software application to generate and cause display of a user interface on the client device, the user interface including a prompt related to job-seeking guidance for the user;

based on an indication of a first action, by the user, received from the client device in response to the prompt, selecting and processing a first node of the personalized conversation graph to cause display, in the user interface, of a first incentive content item associated with a first interactive dialogue represented by the first node of the personalized conversation graph, and a first call-to-action content item associated with the first incentive content item; and in response to a further indication of a second action received from the client device in response to the first call-to action content item, selecting and processing a second node, connected via an edge to the first node, in the personalized conversation graph to cause display, in the user interface, of a further incentive content item associated with a further interactive dialogue represented by the second node of the personalized conversation graph, and a further call-to-action content item associated with the further incentive content item.

17. The non-transitory machine-readable storage medium of claim 16, wherein the plurality of interactive dialogues represented by the plurality of the nodes of the personalized conversation graph correspond to a plurality of software modules associated with the software application, wherein the executing of the software application includes:

executing the plurality of software modules according to a sequence of the plurality of nodes associated with the personalized conversation graph in response to receiving one or more indications of actions from the client device, the one or more indications of actions corresponding to the one or more edges of the personalized conversation graph, the executing of the plurality of software modules resulting in the sequenced delivery of digital content associated with the plurality of the software modules to the client device, and wherein the causing of the display of the first incentive content item and of the first call-to-action content item is performed as a result of the executing of a first software module.

18. The non-transitory machine-readable storage medium of claim 17, wherein the generating of the personalized conversation graph associated with the user identifier includes:

using the one or more machine learning algorithms, generating, for each of the plurality of software modules, a relevance score that indicates a level of relevance of the digital content associated with a particular software module to the user;

selecting a set of software modules from the plurality of software modules based on relevance scores associated with the software modules included in the set exceeding a relevance threshold value; and associating a node of the personalized conversation graph with a software module of the set of software modules based on the relevance score associated with the software module.

19. The non-transitory machine-readable storage medium of claim 16, wherein the personalized conversation graph includes one or more classes of nodes, and wherein a class of nodes of the one or more classes of nodes represents a topic associated with the conversational flow, the method further comprising:

using the one or more machine learning algorithms, generating, for each node included in the class of nodes, a user-action-based score based on one or more indications of actions received from the client device in response to one or more content items displayed in the user interface on the client device;

ranking the nodes included in the class of nodes based on the user-action-based scores, and selecting the further node that represents the further incentive content item associated with the further interactive dialogue from the class of nodes based on the ranking of the nodes included in the class of nodes.

20. The method of claim 19, wherein the user-action-based score represents a probability that the user would perform a particular action in response to a particular call-to action content item associated with a particular node, the probability being computed using the one or more machine learning algorithms, and wherein the probability is re-computed after receiving one or more indications of actions from the client device in response to one or more content items displayed in the user interface on the client device.

* * * * *